(12) United States Patent
Li et al.

(10) Patent No.: US 10,874,125 B2
(45) Date of Patent: Dec. 29, 2020

(54) METHOD FOR IMPROVING THE COOKING QUALITY OF BROWN RICE BY LACTIC ACID BACTERIA FERMENTATION

(71) Applicants: Yongfu Li, Wuxi (CN); Xin Cheng, Wuxi (CN); Feng Shi, Wuxi (CN); Li Wang, Wuxi (CN); Zhengxing Chen, Wuxi (CN); Yanan Li, Wuxi (CN); Ren Wang, Wuxi (CN); Xiaohu Luo, Wuxi (CN); Juan Li, Wuxi (CN)

(72) Inventors: Yongfu Li, Wuxi (CN); Xin Cheng, Wuxi (CN); Feng Shi, Wuxi (CN); Li Wang, Wuxi (CN); Zhengxing Chen, Wuxi (CN); Yanan Li, Wuxi (CN); Ren Wang, Wuxi (CN); Xiaohu Luo, Wuxi (CN); Juan Li, Wuxi (CN)

(73) Assignee: Jiangnan University, Wuxi (CN)

( * ) Notice: Subject to any disclaimer, the term of this patent is extended or adjusted under 35 U.S.C. 154(b) by 247 days.

(21) Appl. No.: 15/891,386

(22) Filed: Feb. 8, 2018

(65) Prior Publication Data
US 2018/0338514 A1    Nov. 29, 2018

(30) Foreign Application Priority Data
May 27, 2017    (CN) .......................... 2017 1 0390030

(51) Int. Cl.
*A23L 7/104*     (2016.01)
*A23L 7/10*      (2016.01)

(52) U.S. Cl.
CPC ............. *A23L 7/104* (2016.08); *A23L 7/115* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,927,660 | A * | 5/1990 | Sano ...................... | A23L 7/196 426/618 |
| 2002/0106424 | A1* | 8/2002 | Ogawa .................. | A23L 33/175 426/52 |
| 2009/0186388 | A1* | 7/2009 | Hanya ..................... | C12N 1/20 435/106 |
| 2014/0120212 | A1* | 5/2014 | Cadena-Garcia ..... | A23L 7/1975 426/18 |

OTHER PUBLICATIONS

Oh et al. (KR 1020150111410) Derwent Abstract (Year: 2015).*

(Continued)

*Primary Examiner* — Felicia C Turner
(74) *Attorney, Agent, or Firm* — Lili Chen

(57) ABSTRACT

The invention discloses a method for improving the cooking and eating quality of brown rice by using Lactic acid bacteria fermentation, which belongs to the technical field of food processing. The method comprises the steps of mixing activated lactic acid bacteria with water and brown rice, loading the mixture into a one-way outgassing container, removing excess air or filling up the container, and sealing the container and performing fermentation. The invention is very simple and easy to operate, and has very low energy consumption. It is suitable to be up scaled for industrial production and will significantly promote brown rice to become a staple food.

6 Claims, 2 Drawing Sheets a b

(56) References Cited

OTHER PUBLICATIONS

Jeon Pil Dong Nov. 19, 2013 KR 20120049334 Derwent Abstract (Year: 2013).*
Kakinoki et al. BR 201003653 Derwent Abstract (Year: 2012).*
Guan et al. (CN 104342340) Derwent Abstract (Year: 2015).*
Chen et al. CN 105941830 Derwent Abstract Sep. 2016 (Year: 2016).*
Cheng et al. (CN 104171876) Derwent Abstract (Year: 2014).*
Inoue et al. Effects of moisture control, addition of glucose, inoculation of lactic acid bacteria and crushing process on the fermentation quality of rice grain silage 2013 Grassland Science Abstract (Year: 2013).*
KR 1000851290 pp. 1-11 (Year: 2008).*

* cited by examiner

METHOD FOR IMPROVING THE COOKING QUALITY OF BROWN RICE BY LACTIC ACID BACTERIA FERMENTATION

CROSS-REFERENCES AND RELATED APPLICATIONS

This application claims the benefit of priority to Chinese Application No. 201710390030.1, entitled "A Method for Improving the Cooking Quality of Brown Rice by Lactic Acid Bacteria Fermentation", filed May 27, 2017, which is herein incorporated by reference in its entirety.

BACKGROUND OF THE INVENTION

Field of the Invention

The invention relates to a method for improving the cooking quality of brown rice by Lactic acid bacteria fermentation, and belongs to the technical field of food processing.

Description of the Related Art

Rice is one of the most important grain crops in the world which has an annual production of about 500 million tons worldwide. China produces 195 million tons of rice each year, ranking the first in the world. The present rice consumption is mainly white rice, but about 80% of the nutrients in rice are distributed in the cortex and the embryo. Brown rice is whole grain caryopsis (the husk, the bran and the aleurone layer are retained) with the inedible outer hull removed. It has a hard texture and a coarse taste because of the cortex, crude fiber and bran wax, and it is also more time-consuming to cook. Compared with refined white rice, brown rice offers many health benefits as it contains more vitamins, minerals and dietary fiber that are lost during the refining process of white rice. After further processing of brown rice to grind the rice cortex and embryo, although cooking and eating quality is improved, active nutrients such as dietary fibers, unsaturated fatty acids, minerals and vitamins in brown rice are mostly lost. The more refined the processing process, the bigger the loss.

Brown rice is rich in nutrients especially like GABA, oryzanol, and $V_E$ which are mostly lost in white rice. However, due to the existence of rice cortex and embryo, it is difficult for water to penetrate through brown rice during cooking, leading to inadequate water absorption and starch gelatinization. As a result, brown rice has a poor taste and cannot be widely accepted by consumers, which hinders the widespread consumption of brown rice.

In order to improve the cooking quality of brown rice, it is necessary to break the barrier effect of the bran layer and rice embryo on water absorption. Crushing is a common method of processing brown rice, but the starch digestion rate of brown rice is accelerated after crushing. Clinical trial studies have shown that the postprandial blood glucose is higher in people eating brown rice flour than those eating white rice, which is not good for health. The main methods for improving the quality of brown rice include grinding, high-temperature fluidization, soaking, exogenous enzymatic methods, etc. Although the grinding method can significantly improve the water absorption of brown rice, its nutrition loss is big. High-temperature fluidization can form tiny micro-cracks on the surface of brown rice to improve the water absorption, but the physical structure of brown rice grain kernel is greatly damaged, and the storage stability is significantly decreased.

The rice soup solid content and expansion degree of cooked brown rice are increased after alkaline soaking, but the content of GABA decreased significantly. Enzymes used in the enzymatic method can hydrolyze the cellulose, hemicellulose, pectin of the cell wall. During the enzyme treatment, enzymes and brown rice are added to a large amount of water (more than 80% water in the system) and incubated at a certain temperature for a period of time. Good quality rice can be then obtained after drying the enzymatically treated rice. The enzymatic method can improve the brown rice quality while maintaining important nutrients, but it needs to consume a large amount of water and requires a lot of energy in the drying process. Enzyme tanks and other equipment investment is a high. The refining process is complex, which significantly increases the production cost and is not conducive to large-scale and commercial production of brown rice.

*Lactobacillus* is a common fermentation microbe. Lactic acid bacteria fermented rice products include fermentation drinks, rice milk, congee, rice noodles, rice sponge cake, etc., using white rice as the main raw material, which has been crushed or gelatinized. There are also some fermented brown rice products in the market, but the brown rice is also crushed and further processed.

Fermented products of whole grain brown rice are rarely seen in the current market. There is a brown rice fermentation product (e.g. brown rice leaven) which is fermented by yeast or lactic acid bacteria with a large amount of water and the flavor is adjusted by adding honey, salt and malt and other materials. Fermented brown rice is currently very popular in Japan. People soak the brown rice and red beans in water for three hours, and put the evenly mixed brown rice and red beans into a rice cooker. Then heat the rice by using the cooker's "brown rice steam" mode or simple "steam" mode. After steaming, keep the rice in heated temperature, stir it once a day and eat the rice three days later. The current methods for making brown rice fermentation products include either making brown rice leaven or using electric cooker fermentation for household use, which can only be applied in small-scale and are not suitable for the large population or large-scale industrial production.

DETAILED DESCRIPTION

The object of the invention is to provide a low cost, simple and easy method for making easy-to-cook high quality brown rice, which can break brown rice cell wall to increase the water absorption, thereby improving the cooking quality and the taste of brown rice.

The method to increase brown rice cooking quality comprises the following steps. First, mix activated Lactic acid bacteria evenly with water and brown rice, load the mixture into a one-way outgassing container, and seal it after removing excess air or filling up the container with the mixture. Secondly, ferment the brown rice mixture at a controlled temperature and obtain the final fermentation product after drying and packaging. We can thus obtain the brown rice product that is easy to cook, has high content of y-aminobutyric acid (GABA), and with good taste and quality.

In one embodiment of the present invention, the brown rice is whole grain caryopsis (the husk, the bran and the aleurone layer are retained) with the inedible outer hull removed. Brown rice includes ordinary brown rice and colored brown rice. The rice we usually eat is further processed from ordinary brown rice. Red rice, black rice and purple rice are all brown rice, but with a differently-pigmented outer layer.

In one embodiment of the present invention, the Lactic acid bacteria (LAB) is a generic term for bacteria that can produce large amounts of lactic acid from fermentable carbohydrates, including, but not limited to, *Lactobacillus, Leuconostoc, Pediococcus, Lactococcus*, and *Streptococcus*, wherein *Lactobacillus* includes *Lactobacillus plantarum, Lactobacillus casei* and the like. The growth of other bacteria in the fermentation process is inhibited by inoculating lactic acid bacteria. Enzymes produced from Lactic acid bacteria fermentation can decompose the cell wall of brown rice bran to increase water permeability of brown rice.

In one embodiment of the present invention, the one-way outgassing container is a container with a one-way air outlet valve. The container can be buckets or bags that meet food safety requirements, which can exhaust gases produced in the fermentation and block the entry of outside air to form a sealed anoxic or hypoxic environment good for Lactic acid bacteria fermentation. Fermentor can be used as the outgassing container if the cost is allowable.

During the fermentation, the acidity of the fermented brown rice can be controlled by controlling the brown rice moisture, the fermentation temperature, the fermentation time and the like, so as to ensure that the quality of brown rice cooking is improved without adding unpleasant sour taste. Among different fermentation conditions, brown rice moisture is the most important factor on the fermentation results, followed by the fermentation time, the temperature and the inoculum size.

Briefly, activated lactic acid bacteria solution was inoculated at $5 \times 10^7$-$2 \times 10^8$ cfu/g into brown rice, mixed and poured into a fermentation vessel or bag. The initial moisture content of fermentation system was maintained at 25-35%. The fermentation was performed at temperature of 25-40° C. for 16-24 hr. The fermented brown rice was dried and degassed into a sealed package to obtain the final product.

During the fermentation process, the fermentation container can also be intermittently activated. For example, when the bag is used as a fermentation container, it should be flipped every two hours. When using a barrel or other container, it can be rotated every 2 hours.

The moisture content is less than 14% in the final brown rice products. The drying method can be air blast drying at 40° C.

The beneficial effects of the invention include the following:

(1) The invention exploits lactic acid bacteria fermentation in brown rice treatment. Cellulase, hemicellulose and pectinase secreted from lactic acid bacteria can decompose the cell wall of brown rice bran to increase water absorption and the starch gelatinization during brown rice cooking, thus shortening the cooking time. Under the stress of acid, water and hypoxia, brown rice can also activate endogenous degrading enzyme to destroy the structure of cell wall and improve water permeability.

(2) The invention creates a slightly acidic environment by Lactic acid bacteria fermentation. On one hand, it enhances the activity of glutamic acid decarboxylase, increases the content of GABA, and increases the nutritional value of brown rice; On the other hand, it can inhibit the growth of other bacteria and prevent the problem of flavor deterioration caused by the growth of other bacteria.

(3) Any one-way outgassing container that meets the requirements of food safety can be used as the fermentation containers. No specialized fermentor is required in the invention.

(4) The fermentation process of the invention does not require sterilization, and the humidity does not need to be tightly controlled. It is easy to operate in the production process.

(5) The invention uses low moisture fermentation to save both water consumption and the energy consumption used for drying. Therefore, the production cost is greatly reduced.

(6) The method of improving brown rice cooking and eating quality has many advantages such as simple operation, low investment cost, and low energy consumption, and it is easy to be adapted for industrial application.

In summary, compared to the existing methods, the present invention uses lactic acid bacteria fermentation to improve cooking and eating quality of brown rice. It effectively solves the problem that brown rice is difficult to cook or difficult to co-cook with white rice. At the same time, the brown rice of the invention has doubled the content of GABA to 184.2 mg/kg. Consumer can directly steam the brown rice of the invention without soaking. It is easy to operate and the fermented rice maintains both good taste and rich nutrition. In addition, the method of the invention is very simple and easy to operate with low energy consumption. It is suitable to be up scaled for industrial production and will significantly promote brown rice to become a staple food, bringing about both social and economic benefits.

EXAMPLES

Figure 1:
FIG. 1 is a picture of cooked rice from fermented brown rice and raw brown rice in Example 1. a: raw brown rice, b: fermented brown rice.
Figure 1:
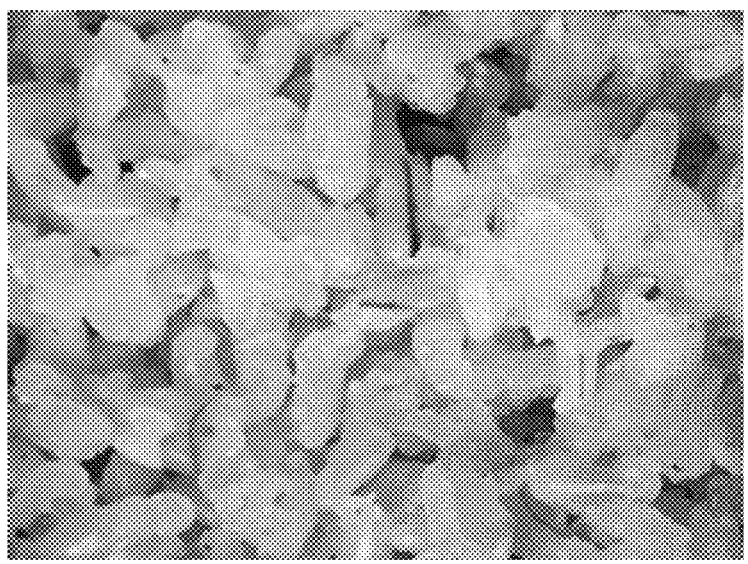

The following examples are intended to further illustrate but not limit the scope of the invention.
Determination/Measurement Methods:

The optimum cooking time is determined as follows: add 150 mL water into a 250 mL beaker, place it on a heating plate and heat to boil, then carefully pour in 5 g whole grain brown rice and record the start timer. Take out 10 grains of rice after 15 minutes, press the rice with a glass slide to see if there is a white core, and repeat it every minute until the white core number is ≤1, and record the stop time. The minutes between the start and the stop time plus 2 min for braising is the optimum cooking time.

Determination of iodine blue value: weigh 7.0 g dry whole grain brown rice to a wire basket, wash it five times with tap water and once with distilled water, put it into a 250 mL beaker and add 50° C. distilled water to the total volume of 150 mL. Cook 20 min in a boiling water pan (start to count the time when the temperature reaches 100° C.). Put the wire basket on top of the beaker until no rice soup drops from it. Dilute the rice soup to 100 mL when it is cooled to room temperature. Take 1 mL supernatant of the rice soup after centrifugation, and add it to 50 mL distilled water, add 5 mL 0.5 mol/L HCl and 1 mL 0.2 g/100 mL iodine reagent, and make the final volume to be 100 mL. The absorbance of the above solution is measured at 660 nm by a spectrophotometer.

Determination of hardness and viscosity of cooked rice: parameters of physical property tester: Operation type is Compression; Pre-Test Speed is 2 mm/sec; Test Speed is 0.5 mm/sec; Post-Test Speed is 0.5 mm/sec; Test cycle index is 1; Target unit is Strain; Target strain is 70.0%; Trigger is 5.0 g; and Detector head is P/35 (35 mm dia cylinder aluminium).

Remove the upper layer of cooked rice, take 3 grains of rice randomly from the middle layer and place symmetrically on the object stage of the physical property tester with the position of the rice grain fixed. Each sample should be determined 8 times, abandon the maximum and minimum value and take the average value of the remaining six results.

Sense assessment is used to assess the acidity of rice: smell the evaporated water vapor during cooking process and taste the rice to assess its acidity.

The method of GABA determination is slightly modified from the reference NY/T 2890-2016: weigh 1 g samples into a 50 mL centrifuge tub; add 10 mL 5% TCA; extract for 30 min using ultrasound-assisted extraction; let it stand for 5 min after 2 min oscillation in vortex mixer; transfer the supernatant to a 25 mL volumetric flask after 2 min centrifugation at the speed of 5000 r/min; repeat the same extraction once with the residue and combine both extracts; and make the final volume to be 25 mL. Filter the extract with double layer filter paper; take 1 ml filtrate and centrifuge it at 10,000 rpm for 10 minutes; and take 400 μl supernatant for the test. The chromatographic conditions are as follows: $C_{18}$ chromatographic column: 250 mm×4.6 mm, 5 μm; detection wavelength: 436 nm; column temperature: 30° C.; injection volume: 10 μL; mobile phase: acetonitrile with sodium acetate solution; and flow rate: 1.0 mL/min.

Determination of moisture content in brown rice: put a clean aluminum box with a lid beside into a 105° C. oven for 1 hr; take it out, cover it, cool it in a dryer for 0.5 hr, weigh the cooled aluminum box with the lid; and repeat drying and weighing the box after drying until the difference of two consecutive values is less than 2 mg. The last weight is the mass of the aluminum box ($m_3$). Ground the brown rice and sift it by a 60 mesh sieve; weigh 2 g (accurate to 0.0001 g) into the aluminum box with sample thickness less than 5 mm. This is the combined mass of the aluminum box and the sample before drying ($m_1$). Place it in the 105° C. oven for 1 hr, take it out, cover it, and cool it for 0.5 h in the dryer; weigh the cooled aluminum box with the lid; and repeat drying and weighing the box after drying until the difference of two consecutive values is less than 2 mg. This last weight is the combined mass of the aluminum box and the dry sample ($m_2$).

The water content in the sample can be calculated by using formula (1).

$$X=(m_1-m_2)/(m_1-m_3)\times 100 \quad \text{formula (1)}$$

Wherein,
X—The moisture content in the sample (%);
$m_1$—Mass of the aluminum box and the sample before drying (g);
$m_2$—Mass of the aluminum box and the sample after drying (g);
$m_3$—Mass of the aluminum box (g).

Determination of water absorption rate at 30° C.: add 220 mL deionized water in a 250 mL beaker; incubate at 30° C. in a water bath; weigh 5.0000 g whole grain rice and pour into a copper wire mesh placed in the 250 mL beaker and start the timer; take out the brown rice after soaking for 15, 30, 45, 60, 80, 100, 130, 160 and 200 minutes, respectively; after drying the surface moisture with gauze, weight the brown rice using an electronic analytical balance.

Water absorption rate (%)=(mass after soaking-mass before soaking)/(mass after soaking×(1-the moisture content))×100%

Example 1

Weigh 1000 g sorted whole grain brown rice; add activated *Lactobacillus plantarum* liquid at the inoculation rate of $5.0\times 10^7$ cfu/g; mix evenly and pour the mixture into a fermentation bag with a one-way air outlet valve; add water to make the initial moisture content of the fermentation system at 25%; perform the fermentation at 35° C. for 24 hours. Dry the fermented rice and seal it in a degassed bag.

Example 2

Weigh 1000 g sorted whole grain brown rice; add activated *Lactobacillus plantarum* liquid at the inoculation rate of $2.0\times 10^8$ cfu/g; mix evenly and pour the mixture into a fermentation bag with a one-way air outlet valve; add water to make the initial moisture content of the fermentation system at 35%; perform the fermentation at 25° C. for 20 hours. Dry the fermented rice and seal it in a degassed bag.

Example 3

Weigh 1000 g sorted whole grain brown rice; add activated *Lactobacillus plantarum* liquid at the inoculation rate of $1.0\times 10^8$ cfu/g; mix evenly and pour the mixture into a fermentation bag with a one-way air outlet valve; add water to make the initial moisture content of the fermentation system at 30%; perform the fermentation at 40° C. for 16 hours. Dry the fermented rice and seal it in a degassed bag.

Comparative Example 1

Weigh 1000 g sorted whole grain brown rice; add activated *Lactobacillus plantarum* liquid at the inoculation rate of $1.5\times 10^8$ cfu/g; mix evenly and pour the mixture into a fermentation bag with a one-way air outlet valve; add water to make the initial moisture content of the fermentation system at 20%; perform the fermentation at 35° C. for 24 hours. Dry the fermented rice and seal it in a degassed bag.

Comparative Example 2

Weigh 1000 g sorted whole grain brown rice; add activated *Lactobacillus plantarum* liquid at the inoculation rate of $1.5\times 10^8$ cfu/g; mix evenly and pour the mixture into a fermentation bag with a one-way air outlet valve; add water to make the initial moisture content of the fermentation system at 40%; perform the fermentation at 35° C. for 16 hours. Dry the fermented rice and seal it in a degassed bag.

Summary of the Results

The pictures of brown rice before (FIG. 1a) and after (FIG. 1b) the fermentation with lactic acid bacteria are shown in FIG. 1. It can be seen in FIG. 1 that the endosperm grin rate and the cracking degree of rice cortex were significantly higher in fermented brown rice than those in raw brown rice, indicating that the cooking quality of brown rice after fermentation was well improved.

The cooking method of brown rice is as follows: weigh and wash 100 g rice from Example 1 and raw brown rice, respectively; put them into respective rice cookers and add 190 g tap water; and cook for 60 minutes including 25 min holding time.

Figure 2:
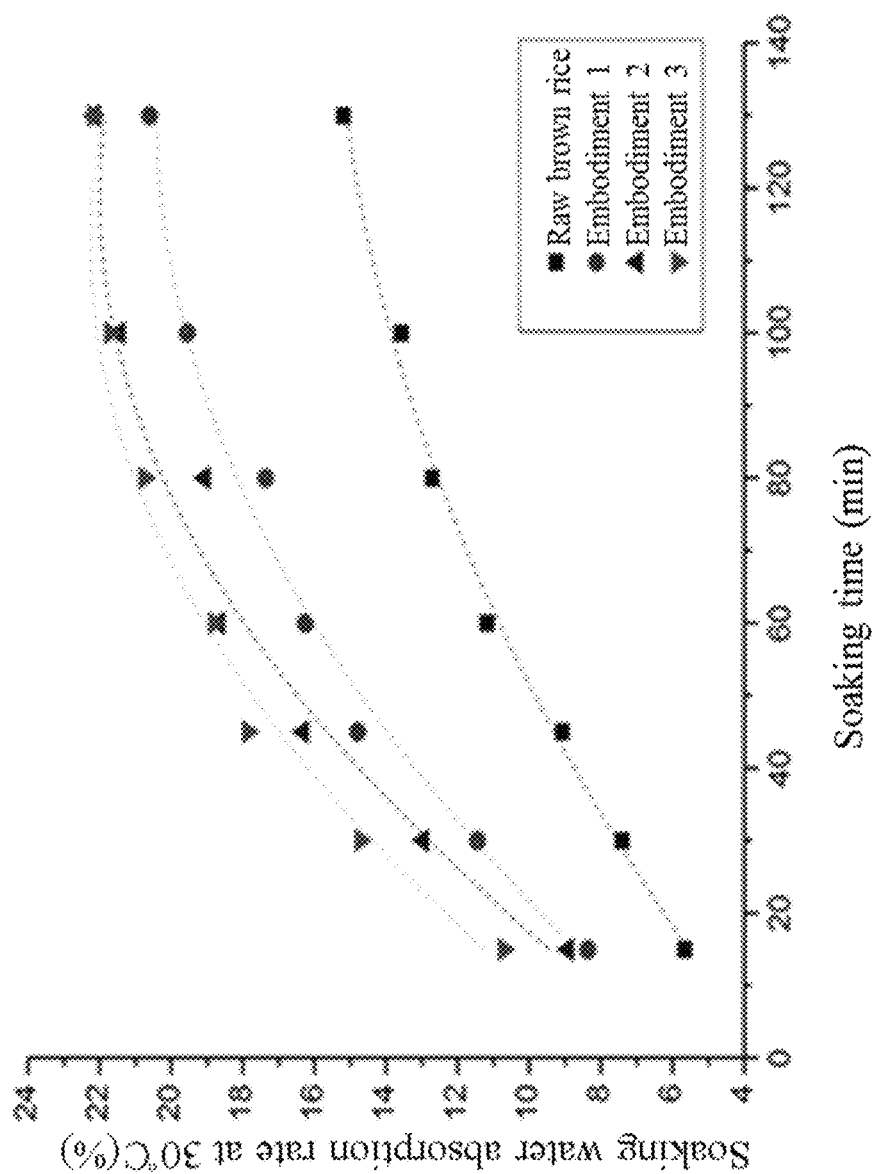
FIG. 2 is a comparison chart of the water absorption rate of fermented brown rice and raw brown rice at 30° C. as in Examples 1-3.

The water absorption of fermented brown rice from Example 1-3 is compared with the raw brown rice in FIG. 2. The quantity and rate of water absorbability in fermented brown rice increased significantly compared to that of the raw brown rice.

The optimum cooking time, the iodine blue value, the rice hardness, the rice viscosity and GABA content are shown in Table 1.

TABLE 1

Comparison of cooking quality, acidity and GABA content of brown rice before and after fermentation

| Project | Optimum cooking time (min) | Iodine blue value | Rice hardness (g) | Rice viscosity (g · s⁻¹) | Rice acidity | GABA content (mg/kg) |
| --- | --- | --- | --- | --- | --- | --- |
| Raw brown rice | 28.20 | 0.139 | 1417.2 | 37.1 | none | 61.4 |
| Example 1 | 22.99 | 0.213 | 932.6 | 69.2 | slight | 175.2 |
| Example 2 | 23.11 | 0.204 | 942.3 | 67.3 | slight | 184.2 |
| Example 3 | 23.20 | 0.207 | 951.1 | 65.9 | slight | 179.5 |
| Comparative Example 1 | 25.31 | 0.161 | 1209.4 | 49.1 | slight | 73.7 |
| Comparative Example 2 | 23.17 | 0.205 | 949.3 | 68.7 | heavy | 181.1 |

The results of Table 1 show that the fermentation treatment in Example 1-3 significantly shortened the cooking time and improved the cooking quality of brown rice. The increase of iodine blue content indicates increased release of starch and other soluble substances and improved rice taste. Rice hardness is decreased and the viscosity is significantly increased in fermented brown rice, indicating better taste and eating quality. These data show that suitable fermentation conditions can improve brown rice taste and quality. The acidity of rice is due to the accumulation of lactic acid in the fermentation process. When the fermentation is not adequate as shown in comparative Example 1, the brown rice quality and taste improvement is limited, and cannot meet customers' requirement. When the fermentation is over done as shown in comparative Example 2, increased acidity of the rice is not acceptable to customers, either. It is also shown in Table 1 that GABA content is greatly increased during the fermentation process.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for improving brown rice quality, comprises the steps of:
    1) mixing $5\times10^7$-$2\times10^8$ cfu/g activated *Lactobacillus plantarum* with water and brown rice to obtain a fermentation mixture, wherein the fermentation mixture has an initial moisture content of 25-35%;
    2) loading the fermentation mixture into a one-way outgassing fermentation container;
    3) removing air or filling up the fermentation container with the fermentation mixture; and
    4) sealing the fermentation container and performing fermentation at 25-40° C. for 16-24 hours to obtain fermented brown rice having more GABA than that of brown rice.

2. The method of claim 1, wherein said one-way outgassing container has a one-way air outlet valve; and wherein the container meets the requirements of food safety.

3. The method of claim 1, wherein said *Lactobacillus plantarum* can produce lactic acid from carbohydrates.

4. The method of claim 1, wherein said brown rice is whole grain caryopsis with inedible outer hull removed while retaining the husk, the bran and the aleurone layer.

5. The method of claim 1, further comprising drying said fermented brown rice and packing them in a sealed package.

6. The method of claim 1, wherein moisture content of said fermented brown rice is 14%.

* * * * *